United States Patent
Balakrishnan et al.

(10) Patent No.: US 12,185,209 B2
(45) Date of Patent: *Dec. 31, 2024

(54) SYSTEMS AND METHODS FOR TIERED NETWORK SLICE DESIGN AND MANAGEMENT IN A WIRELESS NETWORK

(71) Applicant: Verizon Patent and Licensing Inc., Basking Ridge, NJ (US)

(72) Inventors: Sabareeswar P. Balakrishnan, Chennai (IN); Viswanath Kumar Skand Priya, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,834

(22) Filed: Nov. 28, 2023

(65) Prior Publication Data
US 2024/0098469 A1 Mar. 21, 2024

Related U.S. Application Data

(63) Continuation of application No. 17/521,514, filed on Nov. 8, 2021, now Pat. No. 11,871,318.

(51) Int. Cl.
*H04W 4/50* (2018.01)
*H04W 12/06* (2021.01)
(Continued)

(52) U.S. Cl.
CPC ............ *H04W 4/50* (2018.02); *H04W 12/06* (2013.01); *H04W 28/0226* (2013.01); *H04W 28/0925* (2020.05); *H04W 28/0992* (2020.05)

(58) Field of Classification Search
CPC ... H04W 4/50; H04W 12/06; H04W 28/0226; H04W 28/0925; H04W 28/0992
See application file for complete search history.

(56) References Cited

U.S. PATENT DOCUMENTS 10,382,903 B2 * 8/2019 Shaw .................... H04L 41/122
10,499,276 B2 * 12/2019 Chan ................. H04W 28/0289
(Continued)

FOREIGN PATENT DOCUMENTS

WO 2017/200978 11/2017
WO WO-2017200978 A1 * 11/2017 ............. H04L 41/28
(Continued)

OTHER PUBLICATIONS

M. Maule, J. Vardakas and C. Verikoukis, "5G RAN Slicing: Dynamic Single Tenant Radio Resource Orchestration for eMBB Traffic within a Multi-Slice Scenario," in IEEE Communications Magazine, vol. 59, No. 3, pp. 110-116, Mar. 2021. (Year: 2021).*
(Continued)

*Primary Examiner* — Yuwen Pan
*Assistant Examiner* — Swati Jain

(57) ABSTRACT

A system may provide for the design and/or modification of network slices associated with a wireless network. The wireless network may include different slices that are associated different sets of service parameters. Slices may include radio access networks ("RANs"), core networks, or other types of networks, which may include respective sets of network functions ("NFs"), which may perform specific functions with respect to a given RAN and/or core network. Different slices, RANs, core networks, and/or NFs may be associated with particular policies and/or tags which may be specified by one or more users associated with a first access level. One or more users associated with a second access level may configure portions of the wireless network, and the policies and/or tags associated with particular slices, RANs, core networks, or NFs may be automatically implemented by an orchestration system that configures the wireless network based on the provided configuration information.

20 Claims, 10 Drawing Sheets

(51) Int. Cl.
*H04W 28/02* (2009.01)
*H04W 28/08* (2023.01)

(56) References Cited

U.S. PATENT DOCUMENTS

| | | | |
|---|---|---|---|
| 10,602,320 B2* | 3/2020 | Shaw | H04L 63/0815 |
| 11,102,696 B1* | 8/2021 | Chockalingam | H04W 36/322 |
| 11,129,214 B2* | 9/2021 | Aijaz | H04W 40/248 |
| 11,356,859 B2* | 6/2022 | Mishra | H04W 16/18 |
| 11,388,622 B2* | 7/2022 | Jeong | H04W 48/06 |
| 11,477,208 B1* | 10/2022 | Vallejo Ureña et al. | H04L 63/0853 |
| 11,606,303 B1 | 3/2023 | Jagannatha et al. | |
| 11,663,524 B2* | 5/2023 | Bikumala | G06N 3/088 706/12 |
| 11,671,332 B2* | 6/2023 | Savoor | H04L 41/0897 709/224 |
| 11,683,740 B2* | 6/2023 | Zheng | H04L 41/147 455/452.1 |
| 11,743,125 B2* | 8/2023 | Bansal | H04L 41/0893 709/223 |
| 2013/0143542 A1* | 6/2013 | Kovvali | H04W 88/18 455/418 |
| 2018/0316543 A1 | 11/2018 | Hwang | |
| 2019/0037409 A1 | 1/2019 | Wang et al. | |
| 2019/0053104 A1* | 2/2019 | Qiao | H04W 28/24 |
| 2019/0140904 A1 | 5/2019 | Huang et al. | |
| 2020/0052991 A1* | 2/2020 | Kodaypak | H04W 28/16 |
| 2020/0053083 A1 | 2/2020 | Kunz et al. | |
| 2020/0053531 A1 | 2/2020 | Myhre et al. | |
| 2020/0106680 A1* | 4/2020 | Chen | G06Q 10/063 |
| 2020/0154292 A1* | 5/2020 | Bor-Yaliniz | H04L 41/40 |
| 2020/0169921 A1 | 5/2020 | Zhu et al. | |
| 2021/0144517 A1 | 5/2021 | Guim et al. | |
| 2021/0185532 A1* | 6/2021 | Salkintzis | H04W 12/106 |
| 2021/0211357 A1* | 7/2021 | Yi | H04L 41/0895 |
| 2021/0219218 A1 | 7/2021 | Chen et al. | |
| 2021/0258430 A1 | 8/2021 | Saji | |
| 2022/0007277 A1* | 1/2022 | Yu | H04W 60/00 |
| 2022/0021608 A1 | 1/2022 | Doshi et al. | |
| 2022/0086864 A1* | 3/2022 | Sabella | H04L 41/0895 |
| 2022/0124486 A1* | 4/2022 | Andrews | H04W 12/71 |
| 2022/0132413 A1 | 4/2022 | Hu | |
| 2022/0182416 A1 | 6/2022 | Raleigh | |
| 2022/0217610 A1 | 7/2022 | Zheng | |
| 2022/0322112 A1* | 10/2022 | Maria | H04L 41/0846 |
| 2023/0107631 A1 | 4/2023 | Chenumolu et al. | |
| 2023/0179603 A1* | 6/2023 | Gopinathapai | H04L 63/104 726/4 |
| 2023/0283521 A1* | 9/2023 | Berger | H04L 63/20 709/223 |

FOREIGN PATENT DOCUMENTS

| | | |
|---|---|---|
| WO | 2022/081303 | 4/2022 |
| WO | WO-2022081303 A1 * | 4/2022 |
| WO | 2023/028527 | 3/2023 |

OTHER PUBLICATIONS

C.-Y. Chang and N. Nikaein, "Closing in on 5G Control Apps: Enabling Multiservice Programmability in a Disaggregated Radio Access Network," in IEEE Vehicular Technology Magazine, vol. 13, No. 4, pp. 80-93, Dec. 2018. (Year: 2018).*

A. S. D. Alfoudi, S. H. S. Newaz, A. Otebolaku, G. M. Lee and R. Pereira, "An Efficient Resource Management Mechanism for Network Slicing in a LTE Network," in IEEE Access, vol. 7, pp. 89441-89457, 2019. (Year: 2019).*

Alfoudi, et al., "An Efficient Resource Management Mechanism for Network Slicing in a L TE Network", in IEEE Access, vol. 7, pp. 89441-89457, 2019, doi: 10.1109/ACCESS.2019.2926446.

Chang, et al., "Closing in on 5G Control Apps: Enabling Multiservice Programmability in a Disaggregated Radio Access Network", in IEEE Vehicular Technology Magazine, vol. 13, No. 4, pp. 80-93, Dec. 2018. (Year: 2018).

Maule, et al., "5G RAN Slicing: Dynamic Single Tenant Radio Resource Orchestration for eMBB Traffic within a Multi-Slice Scenario", in IEEE Communications Magazine, vol. 59, No. 3, pp. 110-116, Mar. 2021. (Year: 2021).

* cited by examiner

301

| User ID | Tier | Authorized slices |
|---|---|---|
| User_A | 1, 2, 3 | Slice_A |
| User_B | 2, 3 | Slice_A |
| User_C | 3 | Slice_B |
| User_D | 1 | Slice_A, Slice_B |
| User_E | 2 | Slice_C |

| Slice | Tags/policies |
|---|---|
| Slice_A | Voice |
| Slice_B | Data, low latency |
| Slice_C | Data |
| Slice_D | Streaming |
| Slice_E | Data, content filter |

FIG. 3B

| Network | Tags/policies |
|---|---|
| RAN_A | 5G, data |
| RAN_B | 5G, low latency |
| RAN_C | LTE, voice |
| RAN_D | LTE |
| RAN_E | LTE, data |

FIG. 3C

| NF | Tags/policies |
|---|---|
| UPF_A | 5G, content filter |
| UPF_B | 5G, georedundant |
| AMF_A | 5G |
| MME_A | LTE, voice |
| MME_B | LTE, data |

FIG. 3D

SYSTEMS AND METHODS FOR TIERED NETWORK SLICE DESIGN AND MANAGEMENT IN A WIRELESS NETWORK

CROSS-REFERENCE TO RELATED APPLICATION

This Application is a Continuation of U.S. patent application Ser. No. 17/521,514, filed on Nov. 8, 2021, titled "SYSTEMS AND METHODS FOR TIERED NETWORK SLICE DESIGN AND MANAGEMENT IN A WIRELESS NETWORK," the contents of which are herein incorporated by reference in their entirety.

BACKGROUND

Wireless networks may offer services to User Equipment ("UEs"), such as voice services, data services, or the like. Wireless networks may offer differentiated services, such as different types of services, services with different Quality of Service ("QoS") parameters, etc. via different "slices." A given slice may include or may be implemented by discrete hardware and/or logical network functions via which a UE may receive network service according to a particular set of parameters.

BRIEF DESCRIPTION OF THE DRAWINGS

FIGS. 3A-3D illustrate example data structures that may include policy and/or tag information associated with one or more users and/or portions of the wireless network, in accordance with some embodiments;

DETAILED DESCRIPTION OF EXAMPLE EMBODIMENTS

The following detailed description refers to the accompanying drawings. The same reference numbers in different drawings may identify the same or similar elements.

Figure 1:
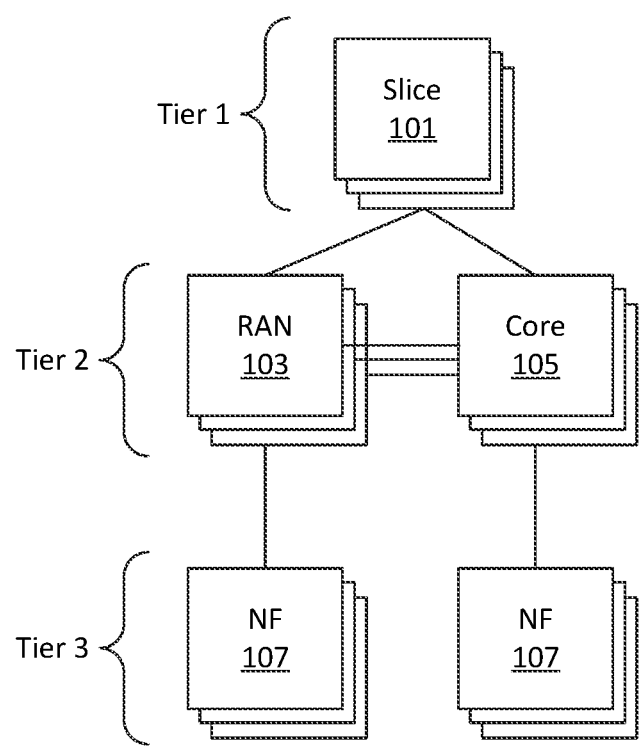
FIG. 1 illustrates an example arrangement of different tiers of a wireless network.

Embodiments described herein provide for the design and/or modification of network slices associated with a wireless network at multiple levels or tiers. For example, as shown in FIG. 1, a "higher" tier (e.g., referred to herein as "tier 1") may be associated with an "end-to-end" level or a "slice" level. Thus, the wireless network may include multiple different slices 101, that are each associated with a differentiated set of service parameters (e.g., different QoS parameters, different application parameters, different service types, etc.). Another tier (e.g., referred to herein as "tier 2"), in some embodiments, may be associated with a "network" level. This tier may include, for example, one or more radio access networks ("RANs") 103, core networks 105, and/or other types of networks. Further, another tier (e.g., referred to herein as "tier 3") may be associated with network functions ("NFs"), which may perform specific functions with respect to a given RAN 103 and/or core network 105. For example, a particular RAN 103 may include a first set of NFs 107, and a particular core network 105 may include a second set of NFs 107. Similarly, different RANs 103 may include different respective sets of NFs 107, and different core networks 105 may include different respective sets of NFs 107. As such, a given slice 101 may include one or more RANs 103 and/or core networks 105. Further, a given RAN 103 may include a set of NFs 107, and a given core network 105 may include a set of NFs 107.

Figure 2:
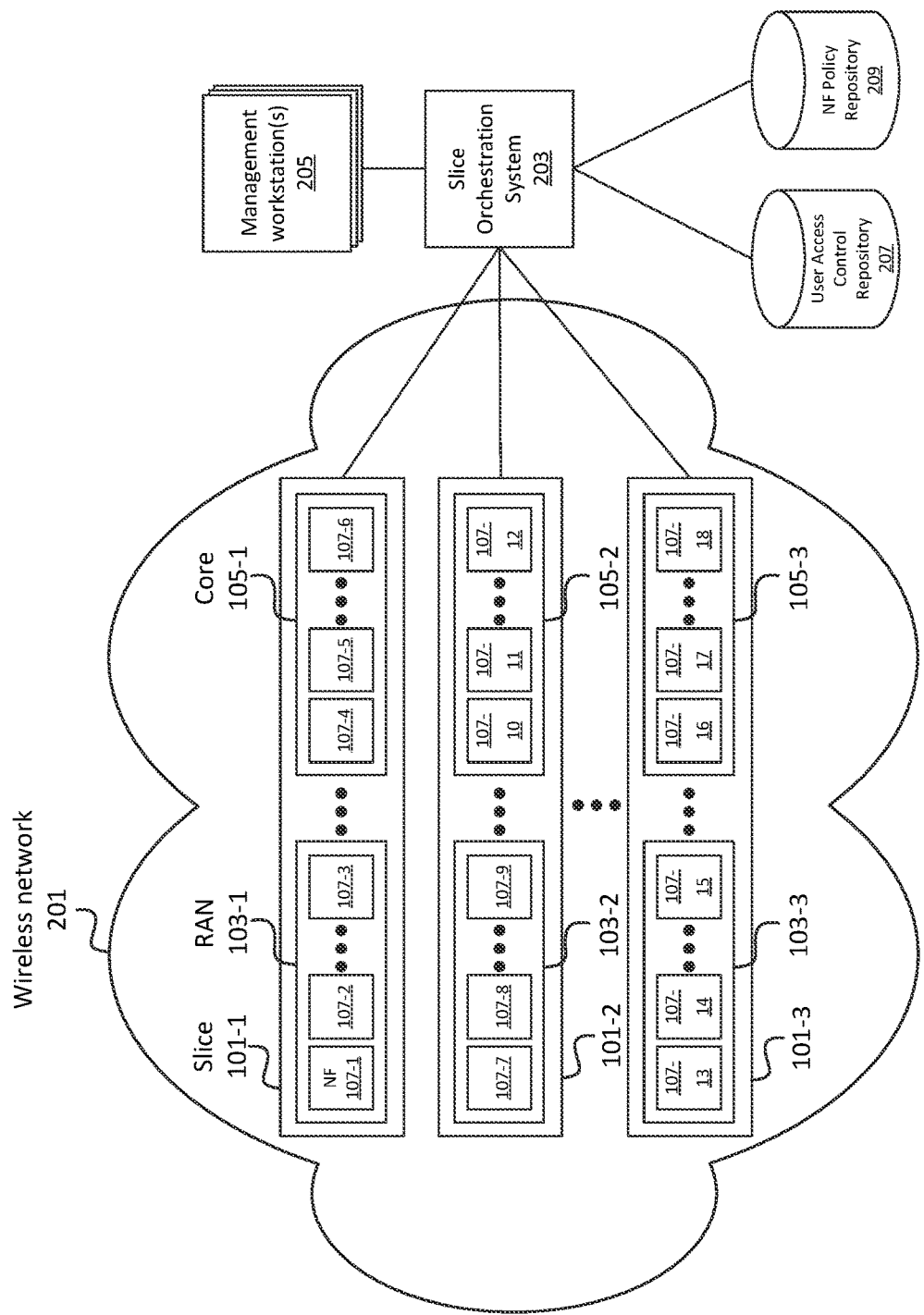
FIG. 2 illustrates an example overview of one or more embodiments described herein.

For example, as shown in FIG. 2, wireless network may include example slices 101-1, 101-2, and 101-3. Slice 101-1 may be associated with a first set of service parameters, slice 101-2 may be associated with a second set of service parameters, and slice 101-3 may be associated with a third set of service parameters. For example, slices 101-1, 101-2, and 101-3 may be associated with different QoS parameters, different traffic or service types (e.g., voice, data, streaming, etc.), different user groups or categories (e.g., users or devices associated with different organizations), different device types or categories (e.g., mobile telephones, Internet of Things ("IoT") devices, autonomous vehicles, etc.), and/or other types of service parameters. Slice 101-1 may also be associated with RAN 103-1 and core network 105-1; slice 101-2 may also be associated with RAN 103-2 and core network 105-2; and slice 101-3 may also be associated with RAN 103-3 and core network 105-3. For example, RANs 103 may each include a respective RAN or type of RAN, such as a Long-Term Evolution ("LTE") RAN, a Fifth Generation ("5G") RAN, an unlicensed (e.g., WiFi) RAN, or some other type of RAN. In some embodiments, different RANs may implement different radio access technologies ("RATs") and/or architectures such as one or more or more 5G RATs (e.g., ultra-wideband, millimeter-wave, etc.), LTE RATs, Third Generation ("3G") RATs, 5G standalone architecture, 5G non-standalone ("NSA") architecture, etc.

Core networks 105 may include a respective core network or type of core network, such as an Evolved Packet Core ("EPC"), a 5G Core ("5GC"), a hybrid EPC/SGC, and/or some other type of core network. NFs 107 may include suitable NFs used to implement a given RAN 103 and/or core network 105, such as a Next Generation Node B ("gNB"), an evolved Node B ("eNB"), an Access and Mobility Management Function ("AMF"), a Mobility Management Entity ("MME"), a User Plane Function ("UPF"), a Packet Data Network ("PDN") Gateway ("PGW"), and/or other types of NFs.

As noted above, slices 101 may be at a first tier, RANs 103 and/or core networks 105 may be at a second tier, and NFs 107 may be at a third tier. In some embodiments, a given slice 101 may include multiple RANs 103 and/or multiple core networks 105, such as a slice 101 that is associated with multiple RANs 103 that implement multiple different RATs and/or multiple core networks 105 that implement multiple different core network technologies. In some embodiments, two different slices 101 may implement the same types of RANs 103 and/or core networks 105, but with different service parameters (e.g., different QoS parameters, different groups of UEs, etc.).

In some embodiments, slices 101, networks 103 and/or 105, and/or NFs 107 may be configured by, or with the assistance of, Slice Orchestration System ("SOS") 203. For example, slices 101, networks 103 and/or 105, and/or NFs 107 may include or may be implemented by one or more Software-Defined Networks ("SDNs"), in which different network devices or systems may be dynamically configured in a containerized environment which may include one or more virtual machines, cloud computing systems, datacenters, servers, or the like. SOS 203 and the devices or systems that implement slices 101, networks 103 and/or 105, and/or NFs 107 may implement a suitable application programming interface ("API") or protocol, such as the open-source Kubernetes API or some other API or protocol, via which SOS 203 may instantiate, provision, install, configure, etc. one or more instances of slices 101, networks 103 and/or 105, and/or NFs 107 on the devices or systems. For example, SOS 203 may receive commands, instructions, etc. from one or more management workstations 205, which may be accessed by network operators, designers, technicians, administrators, or the like. Although referred to herein as "workstations," management workstations 205 may include one or more computers, laptops, mobile devices, tablets, and/or other types of devices or systems. Additionally, or alternatively, SOS 203 may receive automated commands generated using one or more artificial intelligence/machine learning ("AI/ML") techniques or other automated techniques.

As described herein, different users or management workstations 205 may be associated with different access parameters, which may include access to different tiers of wireless network 201 and/or access to particular slices 101, networks 103 and/or 105, and/or NFs 107 of wireless network 201. For example, a given user or management workstation 205 may be associated with "tier 1" access, such that the given user or management workstation 205 may be authorized to generate, delete, modify, etc. one or more slices 101. Another user or management workstation 205 may be associated with "tier 2" access, such that the user or management workstation 205 may be authorized to generate, delete, modify, etc. one or more RANs 103 and/or core networks 105 that are associated with one or more particular slices 101. Another user or management workstation 205 may be associated with "tier 3" access, such that the user or management workstation 205 may be authorized to generate, delete, modify, etc. one or more NFs 107 that are associated with one or more particular RANs 103 and/or core networks 105.

In some embodiments, a "higher" tier level of access may "inherit" or otherwise include access to "lower" tiers. For example, a "tier 1" level of access associated with slice 101-1 may allow for the modification of slice 101-1, including modifying service parameters of slice 101-1 (e.g., QoS parameters, UE access control parameters, etc.) as well as service parameters of RAN 103-1 (e.g., RAT and/or other RAN parameters) and/or core network 105-1 (e.g., core network technology or other core network parameters). As another example, the "tier 1" level of access may also allow for the addition or deletion of one or more RANs 103 and/or core networks 105 to and/or from slice 101-1. Further, the "tier 1" level of access associated with slice 101 may further allow for the modification of service parameters associated with NFs 107-1 through 107-6, which are respectively associated with RAN 103-1 and core network 106-1.

On the other hand, in some embodiments, a "lower" tier level of access may not include access to "higher" tiers. For example, a "tier 3" level of access with respect to slice 101-1 (and/or a RAN 103, core network 105, or NF 107 thereof) may include access to one or more NFs 107 of slice 101, but may not allow for access to modify, add, delete, etc. RANs 103 and/or core networks 105 from slice 101. In some embodiments, the access to a given NF 107 may include access to perform operations such as "healing" a given NF 107, modifying NF 107 parameters, scaling NF 107 (e.g., adding or deleting instances of the same NF 107), and/or other suitable operations. In some embodiments, a "tier 3" level of access may not include the capability to add or delete an NF 107 from a given RAN 103 or core network 105, while a "tier 1" or "tier 2" level of access may allow access to add or delete an NF 107 from a given RAN 103 or core network 105. In some embodiments, on the other hand, certain users may be authorized to access only specific tiers, such as a user that has "tier 1" access but not "tier 2" or "tier 3" access.

In some embodiments, SOS 203 may include and/or may be communicatively coupled to User Access Control Repository ("UACR") 207, which may specify tiers of particular users, groups, management workstations 205, etc. Further, SOS 203 may include and/or may be communicatively coupled to NF Policy Repository ("NPR") 209, which may specify rules, policies, etc. associated with one or more NFs 107. In some embodiments, an administrator of wireless network 201, a "tier 1" user, and/or some other suitable source may specify which users are associated with which portions of network 201, and may further specify rules and/or policies associated with particular NFs 107 that are automatically enforced, configured, etc. when a given NF 107 is instantiated, installed, etc. at wireless network 201.

For example, in some embodiments, management workstation 205 may present a "drag-and-drop" graphical user interface ("GUI") that allows a given user to configure, plan, design, etc. one or more portions of wireless network 201. As discussed below, SOS 203 may identify one or more slices 101 and/or tiers associated with a given user accessing a particular management workstation 205, and may identify NFs 107, RANs 103, core networks 105, and/or slices 101 that the given user is authorized to access, configure, etc. The user may, via the drag-and-drop interface, associate one or more NFs 107 with a given RAN 103 or core network 105, and/or may associate one or more RANs 103 and/or core networks 105 with a given slice 101. The user may also, via the GUI, make one or more changes, view status updates, generate or modify rules and/or policies, and/or perform one or more other operations with respect to a given NF 107, RAN 103, core network 105, and/or slice 101 that the user is authorized to access.

In the examples provided herein, access control is discussed in the context of a "user." In practice, tiers or other access parameters may be associated with management workstations 205 and/or other types of devices, groups, etc. In this manner, access to particular portions of wireless network 201 may be controlled in a granular and secure fashion, as users without sufficient access may not be able to make changes to the network that have unintended or unforeseen consequences to other portions of wireless network 201. Further, as discussed below, users with higher tiers of access (e.g., an administrator associated with wireless network 201, where such administrator may have "tier 1" access) may be able to specify rules, polices, etc. that may be automatically incorporated when a user with a lower tier configures a given RAN 103, core network 105, and/or NF

107. As such, the higher tier users may maintain "end-to-end" control of wireless network 201, without needing to specify or maintain lower tier functionality.

FIG. 3A illustrates an example data structure 301 that may be maintained by UACR 207, specifying particular users along with tiers of access and slices with which such users are associated. For example, as shown, example User_A may be associated with tiers 1, 2, and 3. For example, as discussed above, some embodiments may provide for access only to tiers explicitly indicated as associated with a given user. In other embodiments, as also discussed above, a higher tier may "inherit" access to lower tiers. As further shown here, User_B may have access to tiers 2 and 3 (e.g., RAN 103 and/or core network 105, but not slice 101), and User_C may have access to tier 3 (e.g., NFs 107). As further shown, data structure 301 may indicate one or more slices with which a given user is associated. For example, User_A, User_B, and User_D are associated with Slice_A. Additionally, User_C and User_D are associated with Slice_B (e.g., User_D has access to both Slice_A and Slice_B), and User_E is associated with Slice_C.

FIG. 3B illustrates an example data structure 303 that may indicate policies and/or other tags associated with one or more slices 101. For example, as discussed above, one or more users (e.g., tier 1 users or other users, such as an administrator, operator, etc. of wireless network 201) may configure one or more slices 101 to include a set of tags, capabilities, and/or policies. As discussed here, a "tag" may include, may refer to, and/or may otherwise be associated with a set of capabilities, policies, and/or other parameters. Additionally, or alternatively, in some embodiments, a "tag" may be used to indicate which slices 101, RANs 103, core networks 105, and/or NFs 107 are permitted to be used together and/or which slices 101, RANs 103, core networks 105, and/or NFs 107 are not permitted to be used together. In some embodiments, the "tags" shown in data structure 303 may be based on and/or may include identifiers or parameters associated with given slices 101. Such identifiers or parameters may include a Slice Service Type ("SST") value, a Slice Differentiator ("SD") value, or other suitable identifier or parameter.

As shown, for example, Slice_A may be associated with a "voice" tag. This tag may indicate that a given slice 101 (e.g., referred to as "Slice_A") may have the capability to be used for voice call services, and/or that a set of policies, rules, etc. associated with providing voice call services may be associated with Slice_A. For example, Slice_A may be associated with a particular QoS level that is associated with voice services, one or more RANs 103 associated with Slice_A may be required (e.g., via one or more policies) to implement a particular RAT that supports voice services, Slice_A may be associated with a rule or constraint that requires one or more georedundant NFs 107 in order to provide reliable voice services, etc.

As another example, Slice_B may be associated with a "data" tag and a "low latency" tag. For example, Slice_B may be associated with a particular QoS level that is associated with data services and also provides low latency (e.g., a maximum threshold latency or lower), may be associated with one or more Multi-Access/Mobile Edge Computing ("MEC") devices, referred to sometimes herein simply as a "MEGs" (e.g., in order to provide low-latency services), and/or other rules or policies associated with providing low-latency data services. As another example, Slice_C may be associated with a "data" tag but not a "low latency" tag. As such, Slice_C may have fewer polices, constraints, etc. than Slice_B (e.g., policies, constraints, etc. relating to low latency services). Slice_D may be associated with a "streaming" tag, which may be associated with a QoS level related to providing streaming services, a policy or rule that Slice_D must include one or more Content Delivery Networks ("CDNs") within particular geographical regions, etc. Slice_E may be associated with "data" and "content filter" tags. The "content filter" tag may be associated with one or more rules, policies, etc. that enable content filtering at Slice_E, such as the inclusion of one or more NFs 107 that perform content filtering.

While an example of particular tags and slices is provided with respect to data structure 303, in practice, NPR 209 may maintain additional information and/or differently formatted information in order to store tags, rules, policies, etc. associated with one or more slices. In some embodiments, the information included in data structure 303 may be specified via a given management workstation 205, such as a management workstation 205 associated with an owner and/or operator of wireless network 201, a tier 1 user, and/or some other suitable user or device.

FIG. 3C illustrates example data structure 305 that may include tags and/or policies associated with one or more RANs 103. In some embodiments, similar tags and/or policies may be used for core networks 105. As shown, for example, data structure 305 may include "5G" and "data" tags for a first RAN 103 (RAN_A). For example, RAN_A may implement a 5G RAT, and may implement or include rules and/or policies associated with data services (e.g., QoS policies, georedundancy policies, or the like). For example, a given slice 101 that includes a "data" tag, such as Slice_B may require that any RANs 103 that are placed in the slice 101 must include a "data" tag. In this manner, an end-to-end user associated with slice 101 may be able to enforce policies that provide an end-to-end measure of performance, reliability, etc. without needing to specify particular parameters of networks 103/105 or NFs 107 associated with slice 101.

Similarly, RAN_B may be associated with a "5G" tag and a "low latency" tag, RAN_C may be associated with "LTE" and "voice" tags, RAN_D may be associated with an "LTE" tag, and RAN_E may be associated with "LTE" and "data" tags. In some embodiments, the information included in data structure 305 may be specified via a given management workstation 205, such as a management workstation 205 associated with an owner and/or operator of wireless network 201, a tier 2 user, and/or some other suitable user or device. In some embodiments, as discussed above, a tier 1 user may also have access to configure some or all of the information stored in data structure 305, in embodiments where higher tier users "inherit" access privileges associated with lower tiers.

FIG. 3D illustrates example data structure 307 that may include tags and/or policies associated with one or more NFs 107. As discussed above, NFs 107 may include different types of NFs, such as one or more UPFs, AMFs, MMEs, etc. As similarly discussed above, certain NFs 107 may have certain set of capabilities and/or parameters, such as the capability to support a content filter, georedundant capabilities or requirements (e.g., the placing of one instance of a given NF 107 in wireless network 102, such as via a drag-and-drop operation in a GUI) may require and/or may automatically cause the placement of another instance of the same NF 107 in a geographically diverse location in wireless network 102. In this manner, via one drag-and-drop operation, a user may place or configure multiple instances of a given NF 107 in geographically diverse regions, thus enforcing a georedundancy parameter specified with respect to the given NF 107.

Figure 4A:
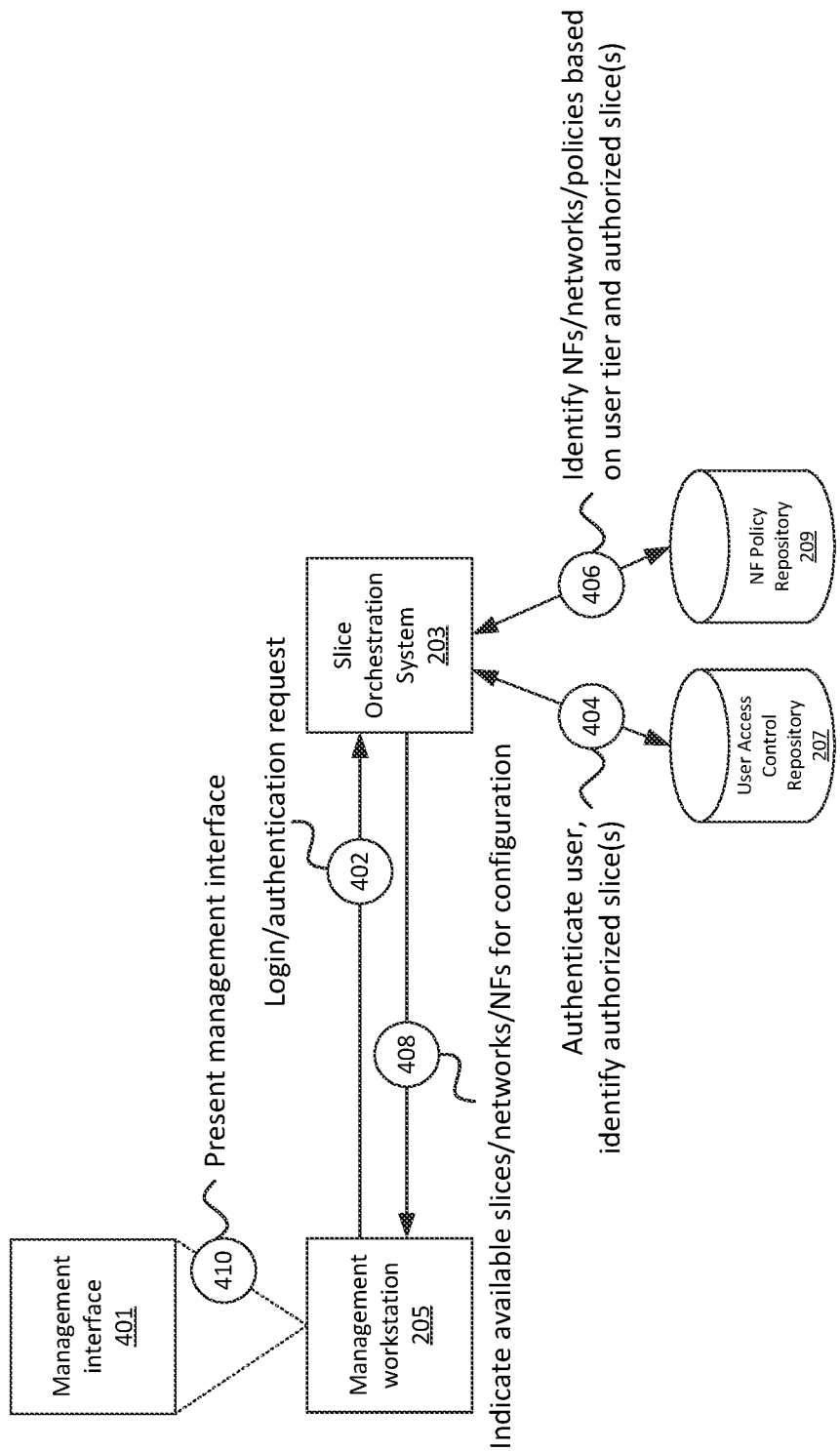
FIGS. 4A and 4B illustrate an example configuration of the wireless network based on configuration parameters provided by a user associated with a particular access level, in accordance with some embodiments.

FIG. 4A illustrates an example of an automatic providing of configuration options to a given user based on a tier and/or other access parameters associated with the given user. As shown, SOS 203 may receive (at 402) a login and/or authentication request from a particular management workstation 205 associated with the user. For example, management workstation 205 may implement an application, API, a GUI, etc., via which management workstation 205 may output (at 402) the request to SOS 203. In some embodiments, the request may be provided based on a command, instruction, selection, etc. from a user associated with management workstation 205. For example, the user may desire to utilize a GUI provided by management workstation 205 to modify portions of a particular wireless network 201, such as one or more slices 101, RANs 103, core networks 105, and/or NFs 107.

As noted above, some users or management workstations 205 may be associated with different tiers, access levels, etc. SOS 203 may authenticate the user and/or management workstation 205 by communicating with UACR 207. For example, the request (at 402) may include authentication credentials such as a password, an authentication token, or some other suitable type of authentication mechanism. UACR 207 may maintain information that can be used (e.g., by UACR 207 and/or by SOS 203) to identify or authenticate a particular user or management workstation 205. As also discussed above, UACR 207 may maintain information indicating one or more slices 101 with which the user is associated, one or more tiers with which the user is associated, etc.

SOS 203 may also identify (at 406) one or more RANs 103, core networks 105, and/or NFs 107 with which the user is associated based on information maintained or provided by NPR 209. For example, SOS 203 may identify (at 404) that the user is associated with a given slice 101, and may identify tags, policies, etc. associated with the given slice 101 based on information maintained by UACR 207. SOS 203 may identify RANs 103, core networks 105, and/or NFs 107 that have tags that correspond to tags and/or policies associated with the given slice 101. For example, if the given slice 101 is associated with a "low latency" tag, SOS 203 may identify (at 406) a set of RANs 103, core networks 105, and/or NFs 107 that are also associated with the "low latency" tag.

SOS 203 may indicate (at 408) one or more slices 101, RANs 103, core networks 105, and/or NFs 107 that were identified (at 404 and/or 406) as being associated with the user and/or management workstation 205. Management workstation 205 may present management interface 401, which may include a GUI or other type of user interface, indicating the slices 101, RANs 103, core networks 105, and/or NFs 107 that were identified (at 404 and/or 406) as being associated with the user and/or management workstation 205. Management interface 401 may, in some embodiments, not include slices 101, RANs 103, core networks 105, and/or NFs 107 that were not identified (at 404 and/or 406) as being associated with the user and/or management workstation 205. In this manner, the user may only be presented with options to add, delete, modify, etc. portions of wireless network 201 that the user is authorized to perform operations on. In some embodiments, one or more slices 101, RANs 103, core networks 105, and/or NFs 107 that were not identified (at 404 and/or 406) as being associated with the user and/or management workstation 205 may be presented via management interface 401, with an indication that such portions of wireless network 201 are not editable or modifiable by the user. In this manner, the user may be presented with a full view of wireless network 201 to assist with performing operations on portions of the wireless network 201 that the user is authorized to perform operations on (e.g., where such modifications include adding, deleting, modifying configuration information, etc.).

As discussed above, management interface 401 may present drag-and-drop options via which the user may add NFs 107 to a given RAN 103, core network 105, and/or slice 101. Additionally, or alternatively, management interface 401 may present drag-and-drop options via which the user may add RANs 103 and/or core networks 105 to a given slice 101 (e.g., assuming the user is associated with the appropriate tier and/or access level to do so). In some embodiments, management interface 401 may present options (e.g., graphical and/or otherwise selectable options) to perform one or more other operations, such as modifying tags and/or policies associated with a given slice 101, RAN 103, core network 105, and/or NF 107 (e.g., assuming the appropriate tier and/or access level).

Figure 4B:
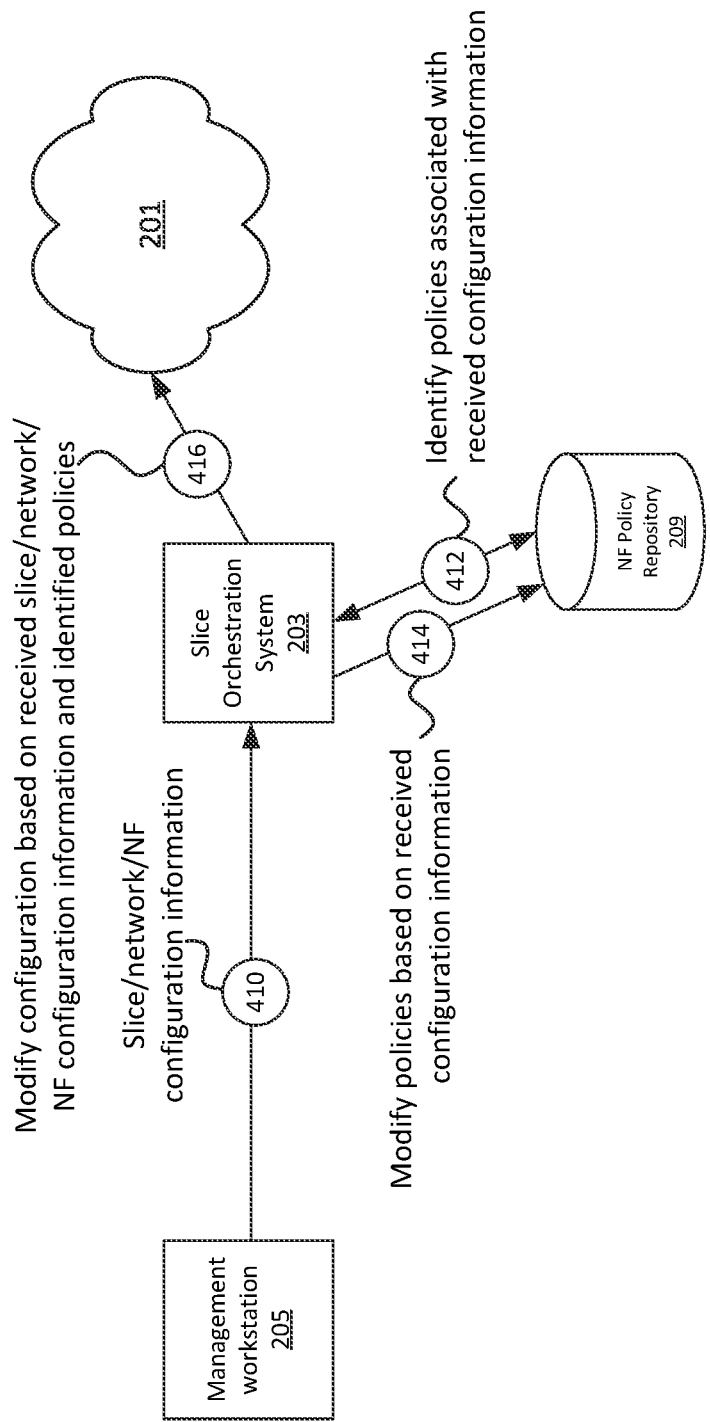

As shown in FIG. 4B, management workstation 205 may output (at 410) configuration information received via management interface 401, which may include an addition of one or more slices 101, RANs 103, core networks 105, and/or NFs 107 to wireless network 201; a removal of one or more slices 101, RANs 103, core networks 105, and/or NFs 107 from wireless network 201; and/or modification of one or more parameters associated with one or more slices 101, RANs 103, core networks 105, and/or NFs 107 of wireless network 201. In some embodiments, configuration information may include information modifying access to one or more slices 101, RANs 103, core networks 105, and/or networks 107 (e.g., a user associated with a higher tier may modify access permissions associated with a lower tier). SOS 203 may, in some embodiments, identify (412) one or more tags and/or policies associated with the received configuration information. For example, NPR 209 may identify one or more additional NFs 107 to place in one or more RANs 103 and/or core networks 105 based on a placement of a particular NF 107 in a particular RAN 103 or core network 105. Such additional NF 107 may be placed based on, for example, a "georedundant" tag associated with NF 107, indicating that if one instance of the NF 107 is added to wireless network 201, then one or more other instances of the same NF 107 will be added to the wireless network 201 at one or more different geographical locations.

As another example, a tag or policy associated with a first NF 107 may specify that one or more other NFs 107 of a different type are required to be added when the first NF 107 is added to wireless network 201. For example, if a particular core network 105 has an "EPC/5GC hybrid" tag, the addition of an EPC NF by a user (e.g., via management interface 401), such as a PGW, may cause a corresponding 5GC NF (e.g., a UPF) to be automatically added without an explicit command or instruction from the user to add the 5GC NF.

As yet another example, a tag or policy associated with a particular RAN 103 may indicate that the particular RAN 103 is a 5G RAN. This tag or policy may indicate a threshold quantity (e.g., at least one, at least ten, etc.) of Next Generation Node B s ("gNB s") are required for the particular RAN 103, and that a configuration or modification of the particular RAN 103 that results in fewer than the threshold quantity of gNB s is not permitted. In such a situation, SOS 203 may indicate an error to management workstation 205, based on which management workstation 205 may indicate (e.g., via management interface 401) that one or more further modifications are required.

In some embodiments, SOS 203 may modify (at 414) one or more policies and/or tags based on received configuration information. For example, the configuration information may include the modification, addition, or deletion of tags and/or policies associated with one or more slices 101, RANs 103, core networks 105, and/or NFs 107. For example, the user may be associated with a tier and/or access level that allows the user to make such modifications, additions, and/or deletions of such tags and/or policies. On the other hand, users without such authorization may be able to view such tags and/or policies, but may not be provided with the option to make modifications to such tags and/or policies.

SOS 203 may further modify (at 416) a configuration of wireless network 201 based on the received (at 410) configuration parameters and the identified (at 412) policies and/or tags associated with the received configuration parameters. For example, SOS 203 may provision, instantiate, etc. one or more NFs 107 on one or more devices or systems of a containerized environment (or other suitable type of environment or platform) based on the addition of one or more slices 101, RANs 103, core networks 105, and/or NFs 107 via management workstation 205. In some embodiments, when one or more RANs 103, core networks 105, and/or slices 101 are added, SOS 203 may further configure routing parameters, associations between NFs 107, configure identifiers (e.g., slice identifiers, Access Point Names ("APNs"), etc.), and/or perform other operations to associate NFs 107 and/or groups of NFs 107 with a given slice 101, RAN 103, and/or core network 105.

Figure 5:
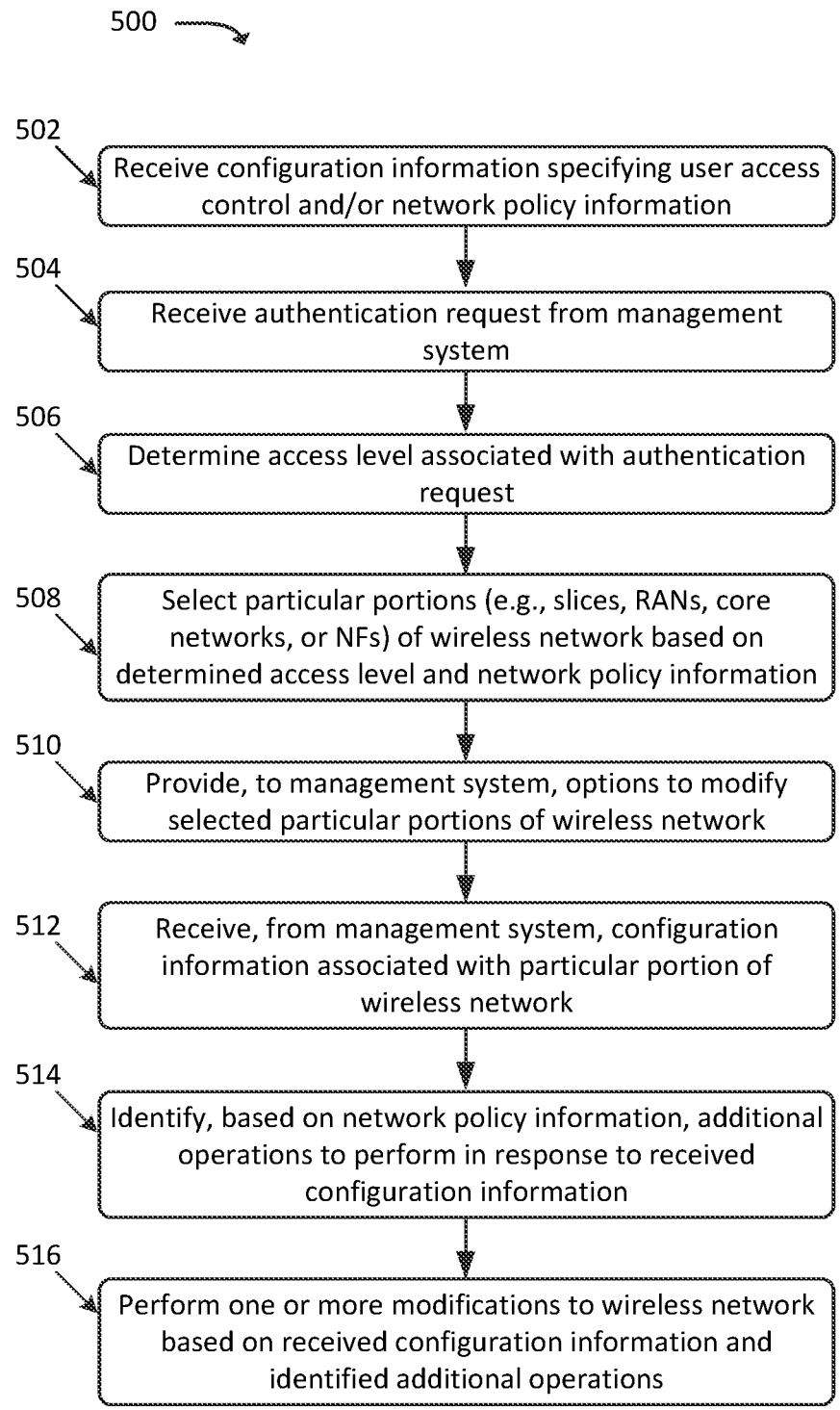
FIG. 5 illustrates an example process for configuring the wireless network based on configuration parameters provided by a user associated with a particular access level, in accordance with some embodiments.

FIG. 5 illustrates an example process 500 for configuring wireless network 201 based on configuration parameters provided by a user associated with a particular access level (e.g., via management workstation 205), in accordance with some embodiments. In some embodiments, some or all of process 500 may be performed by SOS 203. In some embodiments, one or more other devices may perform some or all of process 500 in concert with, and/or in lieu of, SOS 203.

As shown, process 500 may include receiving (at 502) configuration information specifying user access control and/or network policy information. For example, SOS 203 may receive, maintain, etc. such information from UACR 207 and/or NPR 209. As noted above, in some embodiments, UACR 207 and/or NPR 209 may receive manual updates to information maintained by UACR 207 and/or NPR 209 (e.g., from SOS 203 or some other device or system), and/or may automatically update and/or refine such information using artificial intelligence/machine learning ("AI/ML") techniques or other suitable techniques. In some embodiments, SOS 203 may receive such information from UACR 207 and/or NPR 209 on a periodic or intermittent basis, a trigger-based basis, an ongoing basis, and/or on some other basis.

Process 500 may further include receiving (at 504) an authentication request from management system, such as management workstation 205 or some other suitable device or system. For example, SOS 203 may receive an authentication request that includes authentication credentials, an identifier of a particular user, and/or other suitable information. In some embodiments, SOS 203 may authenticate management workstation 205 and/or the user based on authentication information provided by UACR 207 and/or some other device or system.

Process 500 may additionally include determining (at 506) an access level associated with the authentication request. For example, SOS 203 may, based on user access information provided by UACR 207, identify a tier associated with the user.

Process 500 may also include selecting (at 508) particular portions of wireless network 201 based on the determined access level and the received network policy information. For example, SOS 203 may identify one or more network slices 101, RANs 103, core networks 105, and/or NFs 107 with which the user is associated (e.g., authorized to and/or has permission to access, view, add, delete, modify, etc.). As noted above, for example, a user may be associated with a particular tier (e.g., tier 3 in the examples provided above) related to modifying parameters associated with NFs 107, but not for slices 101, RANs 103, or core networks 105. In such scenarios, SOS 203 may identify NFs 107 that are associated with a slice 101, RAN 103, and/or core network 105 with which the user is associated (e.g., as indicated by UACR 207). For example, some slices 101, RANs 103, and/or core networks 105 may have been configured prior to the authentication request from the user associated with management workstation 205. As such one or more NFs 107 may have been configured with a slice identifier, a RAN identifier, a core network identifier, and/or some other information associating a given NF 107 with a given slice 101, RAN 103, and/or core network 105. Further, as discussed above, one or more slices 101, RANs 103, and/or core networks 105 may be associated with one or more tags that indicate one or more policies, constraints, attributes, etc. associated with such slices 101, RANs 103, and/or core networks 105. If SOS 203 identifies that the user is associated with a particular slice 101, RAN 103, and/or core network 105, SOS 203 may further identify particular NFs 107 with tags that are associated with corresponding to (e.g., matching, or corresponding based on one or more rules) tags associated with the with a particular slice 101, RAN 103, and/or core network 105.

Process 500 may further include providing (at 510), to the management system, configuration information associated with the particular portion of the wireless network. For example, SOS 203 may provide information indicating a previously configured slice 101, RAN 103, and/or core network 105 with which the user is associated. Additionally, or alternatively, SOS 203 may provide information indicating that the user is authorized to add a new slice 101, a new RAN 103, and/or a new core network 105 to a given geographical area and/or logical partition of network 201. In some embodiments, SOS 203 may indicate a particular set of NFs 107 that are eligible to be added to one or more slices 101, RANs 103, and/or core networks 105 based on the user access level (e.g., based on a tier of the user and/or based on which particular slices 101, RANs 103, and/or core networks 105 the user is authorized to access or modify). The set of eligible NFs 107 may be a subset of all possible NFs 107 for which NPR 209 provides policy information, as not necessarily all of the available NFs 107 may meet the policies associated with the particular slices 101, RANs 103, and/or core networks 105 that the user is authorized to access or modify.

Process 500 may additionally include receiving (at 512), from the management system, configuration information associated with the particular portion of the wireless network. For example, as discussed above, SOS 203 may receive configuration information that specifies modified parameters for a given slice 101, RAN 103, core network 105, and/or one or more NFs 107 associated therewith (e.g., based on the user access level).

Process 500 may also include identifying (at 514), based on the network policy information, additional operations to perform for the particular portion of wireless network 201 in response to the received configuration information. For example, as discussed above, SOS 203 may identify that a particular NF 107 for which configuration information has been received includes a georedundancy parameter, based on which SOS 203 may determine that at least a second instance of the particular NF 107 should be placed in the particular slice 101, RAN 103, and/or core network 105 when receiving an indication that the particular NF 107 should be added. As another example, SOS 203 may determine that an NF 107 of a second type should be added based on the addition or modification of the particular NF 107 (e.g., to satisfy one or more policies associated with the particular NF 107, and/or with the particular slice 101, RAN 103, and/or core network 105).

Process 500 may further include performing (at 516) one or more modifications to wireless network 201 based on the received configuration information and the identified additional operations. For example, SOS 203 may provision, instantiate, modify, configure, etc. one or more virtual machines, containers, cloud computing systems, etc. to implement the configuration information and/or additional operations. As discussed above, such operations may include instantiating one or more NFs 107 in wireless network 201, removing one or more NFs 107 from wireless network 201, modifying parameters of one or more NFs 107 in wireless network 201, and/or other suitable operations. The additional operations may include operations not specifically requested by the user and/or not specifically indicated in the received (at 512) configuration information. In this manner, policies, rules, constraints, etc. that are configured by a tier 1 or tier 2 user (e.g., an end-to-end administrator, a slice administrator, a RAN administrator, a core network administrator, etc.) may be enforced during the design and/or configuration of particular RANs 103, core networks 105, and/or slices 101 by a lower tier user. As such, policy enforcement and/or implementation across large and/or diverse networks with varying types of NFs 107 may be provided in accordance with some embodiments.

Figure 6:
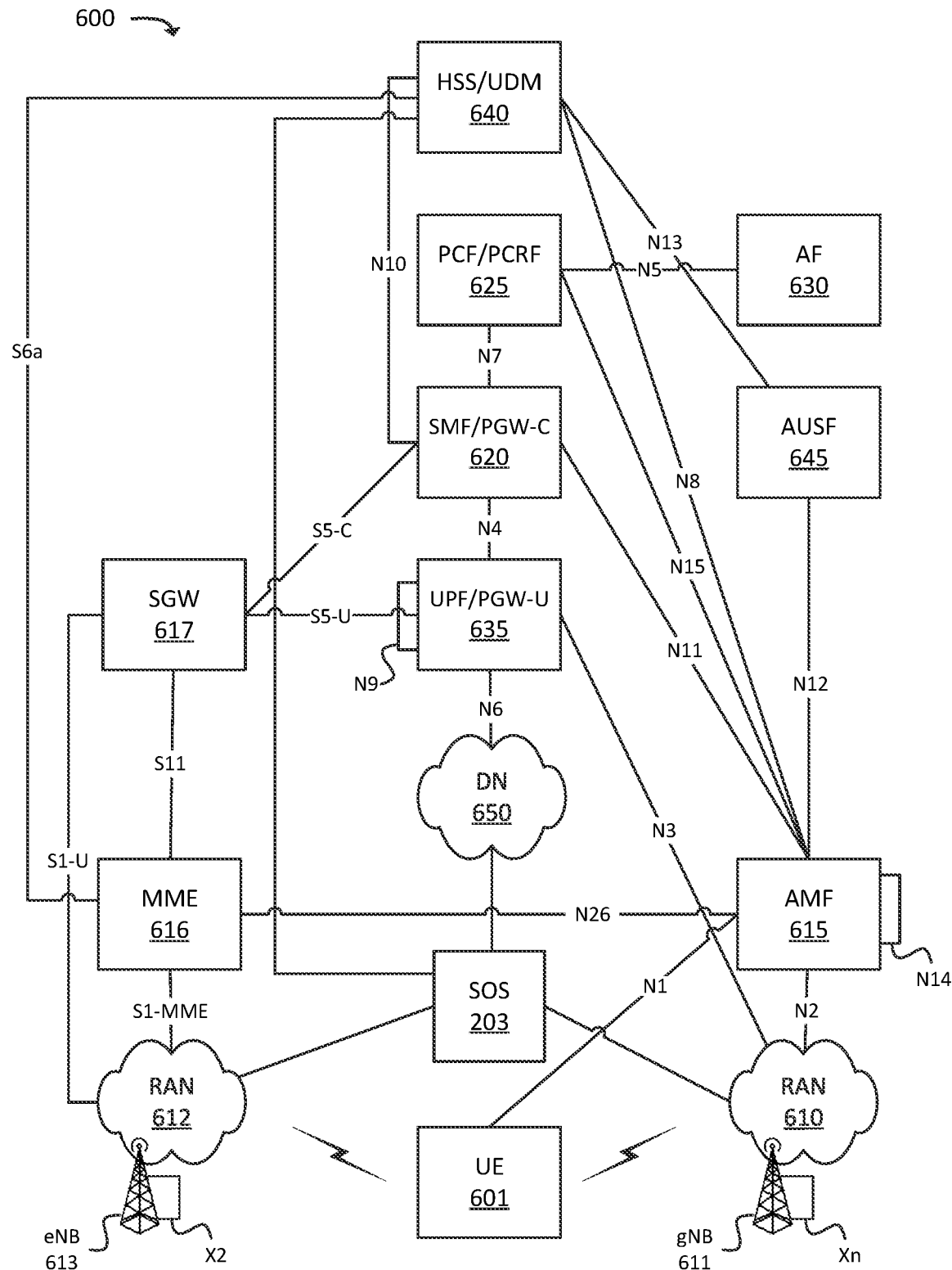
FIG. 6 illustrates an example environment in which one or more embodiments, described herein, may be implemented.

FIG. 6 illustrates an example environment 600, in which one or more embodiments may be implemented. In some embodiments, some or all of environment 600 may include, may be implemented by, may be communicatively coupled to, and/or may be included in one or more wireless networks 201. In some embodiments, environment 600 represents devices, systems, NFs 107, etc. associated with a given slice 101.

In some embodiments, environment 600 may correspond to a Fifth Generation ("5G") network, and/or may include elements of a 5G network. In some embodiments, environment 600 may correspond to a 5G NSA architecture, in which a 5G RAT may be used in conjunction with one or more other RATs (e.g., an LTE RAT), and/or in which elements of a 5G core network may be implemented by, may be communicatively coupled with, and/or may include elements of another type of core network (e.g., an EPC). As shown, environment 600 may include UE 601, RAN 610 (which may include one or more gNBs 611), RAN 612 (which may include one or more evolved Node Bs ("eNBs") 613), and various network functions such as AMF 615, MME 616, Serving Gateway ("SGW") 617, Session Management Function ("SMF")/PGW-Control plane function ("PGW-C") 620, Policy Control Function ("PCF")/Policy Charging and Rules Function ("PCRF") 625, Application Function ("AF") 630, UPF/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as management workstation 205, UACR 207, and/or NPR 209, which may perform one or more operations described above.

The example shown in FIG. 6 illustrates one instance of each network component or function (e.g., one instance of SMF/PGW-C 620, PCF/PCRF 625, UPF/PGW-U 635, HSS/UDM 640, and/or AUSF 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or AUSF 645, while another slice may include a second instance of SMF/PGW-C 620, PCF/PCRF 625, UPF/PGW-U 635, HSS/UDM 640, and/or AUSF 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 601 may include a computation and communication device, such as a wireless mobile communication device that is capable of communicating with RAN 610, RAN 612, and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 601 may send traffic to and/or receive traffic (e.g., user plane traffic) from DN 650 via RAN 610, RAN 612, and/or UPF/PGW-U 635. In some embodiments, UE 601 may include, may implement, may be communicatively coupled to, and/or may be included in one or more instances of management workstation 205.

RAN 610 may be, or may include, a 5G RAN that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, AMF 615, and/or one or more other devices or networks) and may communicate the traffic to UE 601 via the air interface.

RAN 612 may be, or may include, a LTE RAN that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, SGW 617, and/or one or more other devices or networks) and may communicate the traffic to UE 601 via the air interface.

AMF 615 may include one or more devices, systems, Virtualized Network Functions ("VNFs"), Cloud-native Network Functions ("CNFs"), etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices). In some embodiments, multiple UPFs 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, CNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 601. In some embodiments, HSS/UDM 640 may implement, may be implemented by, may include, may be communicatively coupled to, and/or may otherwise be associated with UACR 207 and/or NPR 209.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 601 may communicate, through DN 650, with data servers, other UEs 601, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate.

Figure 7:
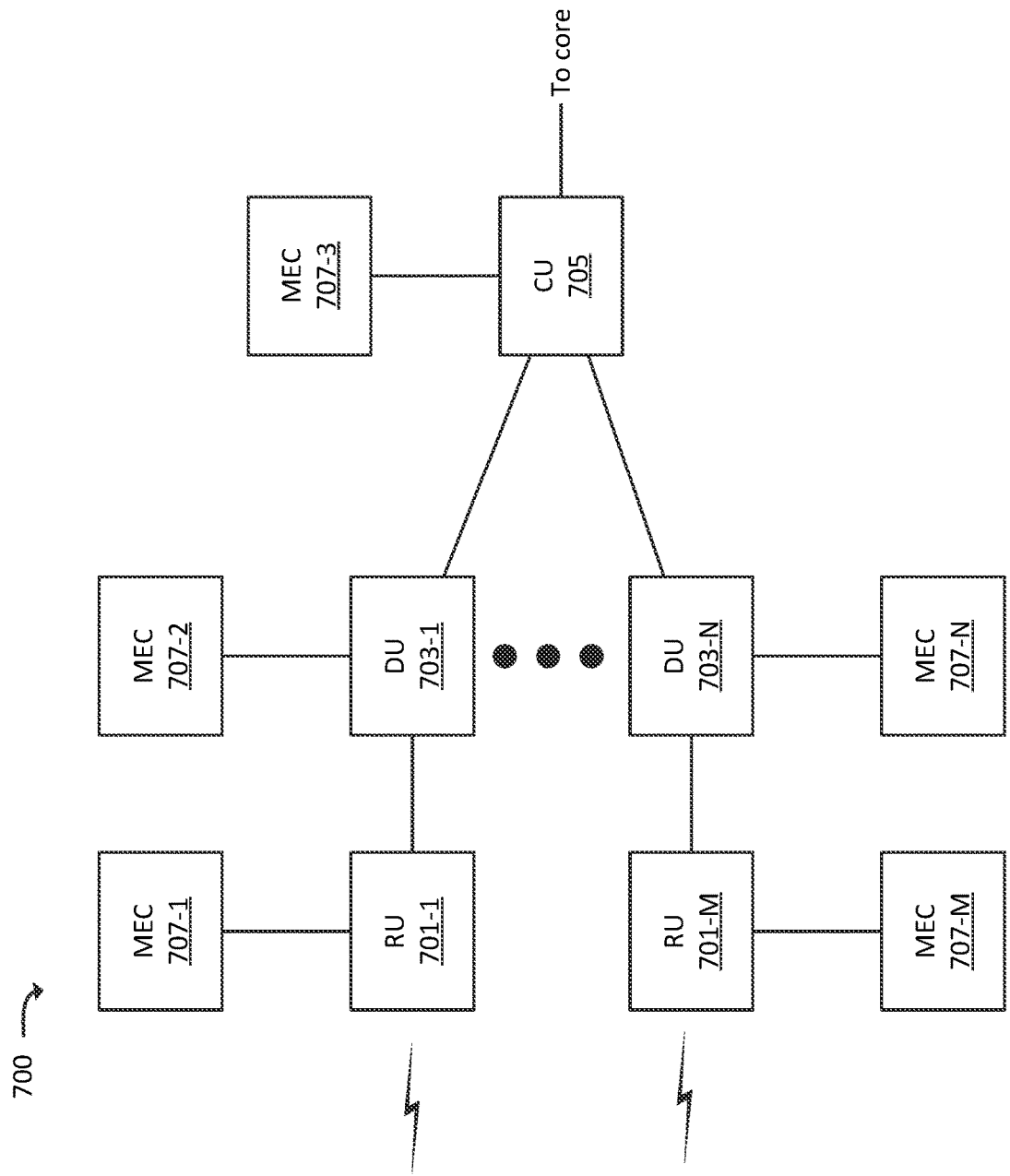
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNB s 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

RUs 701 may, in some embodiments, be communicatively coupled to one or more Multi-Access/Mobile Edge Computing ("MEC") devices, referred to sometimes herein simply as "MECs" 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 601, via a respective RU 701.

For example, RU 701-1 may route some traffic, from UE 601, to MEC 707-1 instead of to a core network (e.g., via DU 703 and CU 705). MEC 707-1 may process the traffic, perform one or more computations based on the received traffic, and may provide traffic to UE 601 via RU 701-1. In this manner, ultra-low latency services may be provided to UE 601, as traffic does not need to traverse DU 703, CU 705, and an intervening backhaul network between DU network 700 and the core network. In some embodiments, MEC 707 may include, and/or may implement, some or all of the functionality described above with respect to SOS 203.

Figure 8:
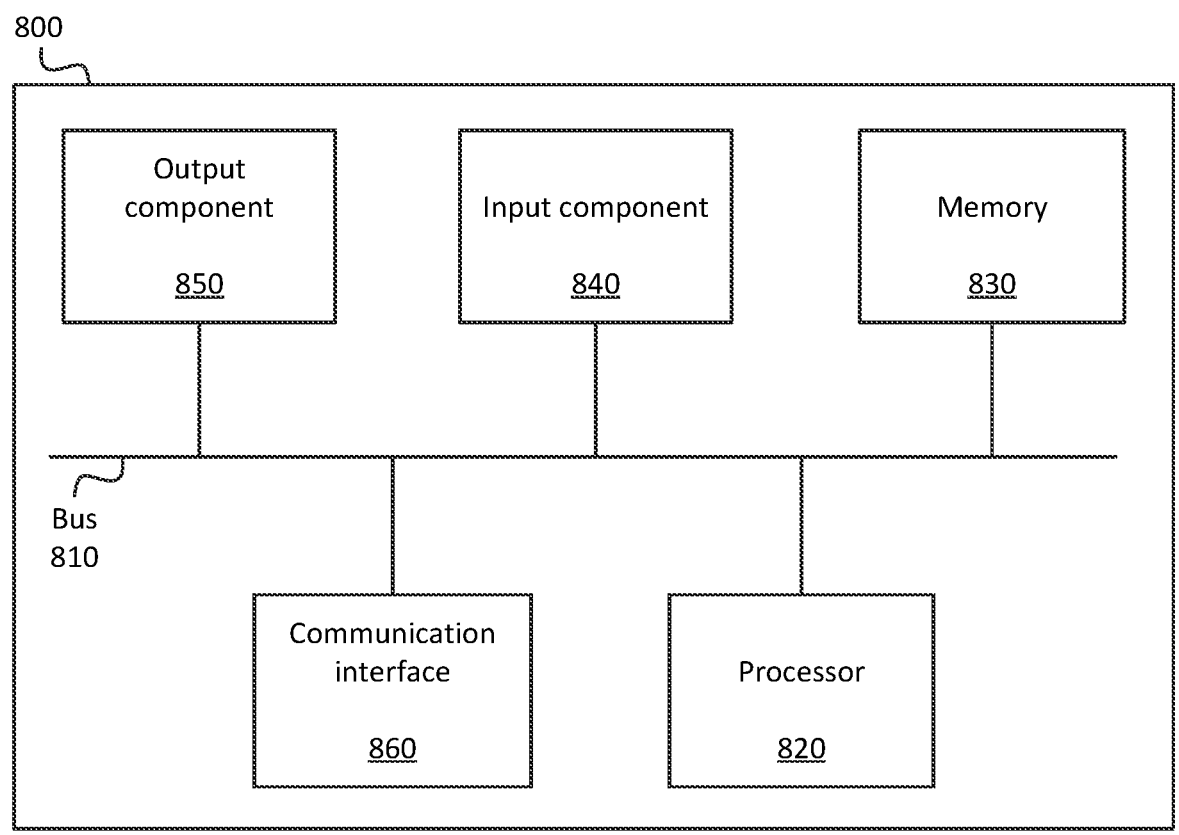
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. In some embodiments, processor 820 may be or may include one or more hardware processors. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
   maintain information access parameters for a wireless network that includes a set of network functions ("NFs"), wherein the access parameters include:
      a first set of access parameters that allow for configuration of the wireless network, and
      a second set of access parameters that allow for modification of configuration parameters of a subset of the set of NFs included in the wireless network;
   determine that a first management system is associated with the first set of access parameters;
   provide, to the first management system and based on determining that the first management system is associated with the first set of access parameters, an option to configure the wireless network, wherein the option to configure the wireless network includes an option to remove one or more NFs from the wireless network;
   receive, from the first management system, an instruction to remove a first NF from the wireless network;
   remove the first NF from the wireless network based on receiving the instruction to remove the first NF from the wireless network;
   determine that a second management system is associated with the second set of access parameters;
   provide, to the second management system and based on determining that the second management system is associated with the second set of access parameters, an option to configure the subset of NFs, without providing an option to remove NFs from the wireless network;
   receive, from second first management system, an instruction to modify a set of configuration parameters of a second NF of the subset of NFs; and
   modify the set of configuration parameters of the second NF based on receiving the instruction to modify the set of configuration parameters of the second NF.

2. The device of claim 1, wherein the wireless network includes at least one of a radio access network ("RAN") or a core network of the wireless network.

3. The device of claim 1, wherein the first set of access parameters further allow for adding NFs to the wireless network, and wherein the second set of access parameters do not allow for adding NFs to the wireless network.

4. The device of claim 3, wherein the first management system presents one or more drag-and-drop options to add NFs to the wireless network.

5. The device of claim 1, wherein the first management system is associated with a first set of authentication credentials, and wherein the second management system is associated with a second set of authentication credentials.

6. The device of claim 1, wherein the one or more processors are further configured to:
identify a set of tags associated with the subset of the set of NFs; and
identify that the second management system is associated with the set of tags,
wherein providing, to the second management system, the option to configure the subset of NFs is based on identifying that the second management system is associated with the set of tags.

7. The device of claim 6, wherein providing the option to configure the subset of NFs that are associated with the set of tags includes not providing an option to configure NFs, of the wireless network, that are not associated with the set of tags.

8. A non-transitory computer-readable medium, storing a plurality of processor-executable instructions to:
maintain information access parameters for a wireless network that includes a set of network functions ("NFs"), wherein the access parameters include:
a first set of access parameters that allow for configuration of the wireless network, and
a second set of access parameters that allow for modification of configuration parameters of a subset of the set of NFs included in the wireless network;
determine that a first management system is associated with the first set of access parameters;
provide, to the first management system and based on determining that the first management system is associated with the first set of access parameters, an option to configure the wireless network, wherein the option to configure the wireless network includes an option to remove one or more NFs from the wireless network;
receive, from the first management system, an instruction to remove a first NF from the wireless network;
remove the first NF from the wireless network based on receiving the instruction to remove the first NF from the wireless network;
determine that a second management system is associated with the second set of access parameters;
provide, to the second management system and based on determining that the second management system is associated with the second set of access parameters, an option to configure the subset of NFs, without providing an option to remove NFs from the wireless network;
receive, from second first management system, an instruction to modify a set of configuration parameters of a second NF of the subset of NFs; and
modify the set of configuration parameters of the second NF based on receiving the instruction to modify the set of configuration parameters of the second NF.

9. The non-transitory computer-readable medium of claim 8, wherein the wireless network includes at least one of a radio access network ("RAN") or a core network of the wireless network.

10. The non-transitory computer-readable medium of claim 8, wherein the first set of access parameters further allow for adding NFs to the wireless network, and wherein the second set of access parameters do not allow for adding NFs to the wireless network.

11. The non-transitory computer-readable medium of claim 10, wherein the first management system presents one or more drag-and-drop options to add NFs to the wireless network.

12. The non-transitory computer-readable medium of claim 8, wherein the first management system is associated with a first set of authentication credentials, and wherein the second management system is associated with a second set of authentication credentials.

13. The non-transitory computer-readable medium of claim 8, wherein the plurality of processor-executable instructions further include processor-executable instructions to:
identify a set of tags associated with the subset of the set of NFs; and
identify that the second management system is associated with the set of tags,
wherein providing, to the second management system, the option to configure the subset of NFs is based on identifying that the second management system is associated with the set of tags.

14. The non-transitory computer-readable medium of claim 13, wherein providing the option to configure the subset of NFs that are associated with the set of tags includes not providing an option to configure NFs, of the wireless network, that are not associated with the set of tags.

15. A method, comprising:
maintaining information access parameters for a wireless network that includes a set of network functions ("NFs"), wherein the access parameters include:
a first set of access parameters that allow for configuration of the wireless network, and
a second set of access parameters that allow for modification of configuration parameters of a subset of the set of NFs included in the wireless network;
determining that a first management system is associated with the first set of access parameters;
providing, to the first management system and based on determining that the first management system is associated with the first set of access parameters, an option to configure the wireless network, wherein the option to configure the wireless network includes an option to remove one or more NFs from the wireless network;
receiving, from the first management system, an instruction to remove a first NF from the wireless network;
removing the first NF from the wireless network based on receiving the instruction to remove the first NF from the wireless network;
determining that a second management system is associated with the second set of access parameters;
providing, to the second management system and based on determining that the second management system is associated with the second set of access parameters, an option to configure the subset of NFs, without providing an option to remove NFs from the wireless network;
receiving, from second first management system, an instruction to modify a set of configuration parameters of a second NF of the subset of NFs; and
modifying the set of configuration parameters of the second NF based on receiving the instruction to modify the set of configuration parameters of the second NF.

16. The method of claim 15, wherein the wireless network includes at least one of a radio access network ("RAN") or a core network of the wireless network.

17. The method of claim 15, wherein the first set of access parameters further allow for adding NFs to the wireless network, and wherein the second set of access parameters do not allow for adding NFs to the wireless network.

18. The method of claim 17, wherein the first management system presents one or more drag-and-drop options to add NFs to the wireless network.

19. The method of claim 15, wherein the first management system is associated with a first set of authentication credentials, and wherein the second management system is associated with a second set of authentication credentials.

20. The method of claim 15, further comprising:
   identifying a set of tags associated with the subset of the set of NFs; and
   identifying that the second management system is associated with the set of tags,
   wherein providing, to the second management system, the option to configure the subset of NFs is based on identifying that the second management system is associated with the set of tags,
   wherein providing the option to configure the subset of NFs that are associated with the set of tags includes not providing an option to configure NFs, of the wireless network, that are not associated with the set of tags.

* * * * *